(12) United States Patent
Thambrahalli et al.

(10) Patent No.: US 9,009,328 B2
(45) Date of Patent: Apr. 14, 2015

(54) SYSTEM AND METHOD FOR DYNAMIC NEGOTIATION OF DEVICE NAME WITH WILDCARD CHARACTER

(75) Inventors: Shashikanth Rao Thambrahalli, Bangalore (IN); Harshavardhana M. Puttamadaiah, Bangalore (IN); Supriya Kannery, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1249 days.

(21) Appl. No.: 11/947,947

(22) Filed: Nov. 30, 2007

(65) Prior Publication Data

US 2009/0144430 A1 Jun. 4, 2009

(51) Int. Cl.
*G06F 15/16* (2006.01)
*H04L 29/12* (2006.01)

(52) U.S. Cl.
CPC ...... *H04L 29/12594* (2013.01); *H04L 61/3045* (2013.01); *Y10S 707/99936* (2013.01)

(58) Field of Classification Search
CPC ............... H04L 61/3045; H04L 29/12594
USPC ............ 709/227, 203, 223; 707/999.006
See application file for complete search history.

(56) References Cited

U.S. PATENT DOCUMENTS

| 6,785,677 B1 * | 8/2004 | Fritchman | 707/6 |
| 2004/0019631 A1 * | 1/2004 | Krissell et al. | 709/203 |
| 2004/0172465 A1 * | 9/2004 | Shuster et al. | 709/223 |

* cited by examiner

*Primary Examiner* — Michael C Lai
(74) *Attorney, Agent, or Firm* — Scully, Scott, Murphy & Presser, P.C.

(57) ABSTRACT

A method and system for dynamically negotiating a device name for establishing a communications session between a host computer and a client computer are provided. A host computer receives from a client computer, a device name that includes as part of the device name at least a wildcard character. The host computer replaces the wildcard character with one or more characters that can be used in device names, to generate a unique device name that is not already being used by the host computer.

20 Claims, 3 Drawing Sheets

SYSTEM AND METHOD FOR DYNAMIC NEGOTIATION OF DEVICE NAME WITH WILDCARD CHARACTER

FIELD OF THE INVENTION

The present application relates to computer device communications and more particularly to dynamic negotiation of device name with wildcard character.

BACKGROUND OF THE INVENTION

Computers, such as the IBM iSeries host, create a virtual device for every client that is connected. Through the virtual device the data flows between the IBM iSeries host and the clients. Each virtual device has a unique device name. These device names are either generated by the iSeries host or specified by the clients as part of NEW ENVIRONMENT data during the Telnet negotiations, which occur during session initiation.

Only one device name can be specified at a time during Telnet negotiation. If the device name specified is already in use by another client then this negotiation tails and the host returns an error warning, for example, "Device already in use". In such a case, the client has to change the device name and negotiate again. This process will go on until a valid device name is negotiated or the user cancels the connection. Many clients automatically disconnect after the first failure while some allow users to modify device name. Yet other clients automatically generate a new device name and restart negotiations. Client may choose yet another option, which lets the Telnet Server generate a device name automatically and assign it to a virtual device.

Different problems arise because only one device name can be negotiated at a time. Customers would like to group all their devices based on some criteria such as, all device using English language are grouped under ENGLISH subsystem, all device using French are grouped under FRENCH subsystem and so on. By grouping this way customers can monitor and manage their devices efficiently. Another way of grouping may be based on departments in a company like all Sales device are grouped under SALES subsystem, Administration under ADMIN subsystem and so on. Each of the device names may begin with EN_DEV and rest of the characters in the device name can be a number 001, 002 etc, thus device names will be formed as EN_DEVN001, EN_DEVN002 etc. Emulators can start trying with EN DEVN001 first and if that name is available the session gets established. But that only happens in an ideal case. It is often the case that EN_DEVN001 device name might already be in use by another client. Emulator can increment and use EN_DEVN002 and try to establish a session. This process can go on until a valid device name is negotiated. However, the process may become time consuming if there are many clients trying to establish a session. That is, many iterations of negotiating and renegotiating may need to be processed before a session gets established.

In addition, because only one device name is negotiated at time, a lot of data flows over the network. Many clients trying to establish sessions will create a considerable amount of data flow and put a burden on the network. This also places heavy load on host computers such as the iSeries host since the hosts need to handle the large number of concurrently occurring negotiations.

For example, for every rejected device name, the iSeries Telnet server sends 75-byte long diagnostic information indicating the rejected device name. The server also sends another request that is about 14 bytes long for resending a device name. The client resends a device name with length of about 25 bytes. Thus, a total of approximately 114 bytes of additional data flows when a device name is rejected. This amount of data is attributed only to the Telnet layer; data from TCP/IP layers and below is not included.

Consider 35 clients trying to establish a session. Applying the above calculations, the amount of Telnet data that flows is approximately 67,830 bytes. That is, the first client will get connected at the first attempt itself the second one at second attempt, third one at third attempt and so on, $35^{th}$ client will get connected at $34^{th}$ attempt. There will be a total of 595 additional attempts to establish a session, thus 595×114=67,830.

Other systems operate by communicating a list of possible device names from which an unused name may be picked. The list, however, could become large and cumbersome. Therefore, what is desirable is a method and system for negotiating a device name for communications that mitigates the burden imposed on the network and the computer systems.

BRIEF SUMMARY OF THE INVENTION

A method and system for dynamically negotiating a device name for establishing a communications session between a host computer and a client computer are provide. The method in one aspect may comprise receiving a device name from a client computer. The device name has one or more fixed characters and at least one wildcard character. The method also includes replacing the wildcard character in the device name with one or more second characters to generate a unique device name that is not already being used in a host computer. The method further includes notifying the client computer of the unique device name for use.

A system for dynamically negotiating a device name for establishing a communications session between a host computer and a client computer, in one aspect, may comprise a host computer operable to receive a device name from a client computer. The device name includes one or more fixed characters and at least a wildcard character. The host computer is further operable to replace the wildcard character in the device name with one or more second characters to generate a unique device name that is not already being used in a host computer. The host computer also notifies the client computer of the unique device name for use.

A program storage device readable by a machine, tangibly embodying a program of instructions executable by the machine to perform the above method of dynamically negotiating a device name for establishing a communications session between a host computer and a client computer is also provided.

Further features as well as the structure and operation of various embodiments are described in detail below with reference to the accompanying drawings. In the drawings, like reference numbers indicate identical or functionally similar elements.

DETAILED DESCRIPTION

A system and method of the present disclosure in one embodiment uses wildcard character as part of device names.

The system and method sends one or more wildcard characters as part of device names during negotiations such as Telnet 5250 to establish a communication session. The description herein refers to Telnet or Telnet 5250 as an example of a communication protocol, and iSeries computers as an example of a host computer. It should be understood, however, that the system and method of the present disclosure may be used in conjunction with any other communication protocols and computers.

An example of the wildcard usage of the present disclosure in a device name may be, "EN_LANG*". The wildcard character '*' or characters may be positioned anywhere in the device name, for example, as a prefix, suffix, or even embedded within the name. Upon receipt of such a device name the iSeries host interprets the wildcard character and substitutes the wildcard character with one or more alphanumerics to generate a unique device name and assigns it to the a virtual device on the iSeries host. The iSeries Telnet Server sends down the automatically generated device name to the Telnet client. Usage of wildcards may ensure that a session is established on the first negotiation attempt itself and renegotiations are not required. Since only one device name with wildcard is sent to the host as part of Telnet negotiations, data flow over the network is considerably reduced, for example, as compared to sending a large list of device names as potential candidates. Usage of wildcards in the device names provides greater flexibility to the host computers such as the iSeries host in generating device names with specified prefixes or suffixes. Wildcard approach of the present disclosure reduces the number of iterations involved in renegotiating and agreeing to a device name.

Based on first few characters of the device name, iSeries can be configured to assign the device to different subsystems. For example, all devices starting with DE_LNG are assigned to a German subsystem, EN_LNG to English subsystem, and so on. This way a device can be better managed. Such naming convention for different subsystems divides the system resources into logical partitions having their own memory allocation, job priority and other attributes. These resources may be shared across all the jobs running in the partition. One or more wildcard characters may be embedded in such existing subsystem names as virtual device names for communicating between the host and client.

Figure 1:
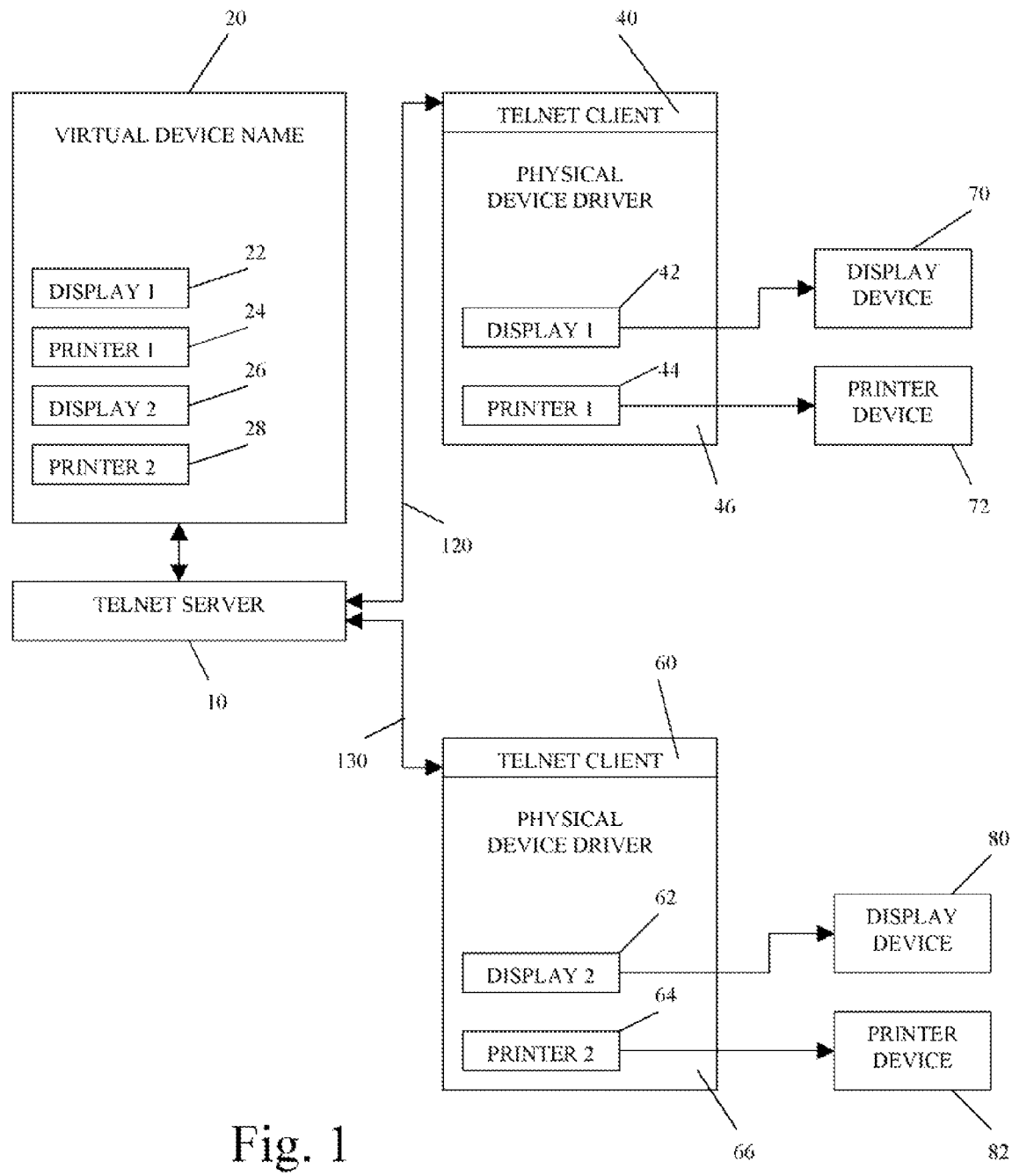
FIG. 1 is a diagram that illustrates a client, connecting to a server using Telnet connection.

The wildcard usage of die present disclosure may be implemented with a few additional changes on the host side, and may not need any changes to the client side, thus providing a simple method for improving the existing system. The method and system of the present disclosure minimizes the need for renegotiations, FIG. 1 is a diagram that illustrates a client connecting to a server using Telnet connection. A client connects to a Telnet server over a TCP/IP communication link. Once connected, that is, a Telnet session is established, the client logs on to the server and runs the applications installed on the server. If the session includes a display session, the server sends to the client, the data required for the client to emulate a host application screen. The client displays the screen in its graphical user interface. Telnet clients 40, 60 are connected to Telnet server 10 by TCP/IP communication links 120, 130 respectively. Each client 40, 60 has the capability to display via display device 70, 80, and print via a print, device 72, 82 through appropriate display drivers 42, 2 and printer drivers 44, 64. The server 10 interacts with virtual devices 20, which include DISPLAY 1 (22), PRINTER 1 (24), DISPLAY 2 (26) and PRINTER 2 (28). These virtual devices 20 represent device support application code in server 10.

Client 40 uses standard RFCs (Request for Comments), for example, 1205, 2877 to request one of the virtual device names 22, 24, 26, 28. These device names 22, 24, 26, 28 correspond to a particular device 70, 72, 80, 82 that exists on the client system. When a client requests for a device name, if the device name does not exist, it is created. Upon receiving a device specific data stream from client, the Telnet server 10 sends the said data stream to virtual device 20. The virtual device 20 processes the data and builds up a response data stream. The response data stream is then sent to Telnet client 40. Based on the selected device name, selected by Telnet server, the data stream can be a display data stream from virtual device 22 sent to display driver 42 and display device 70, or a printer data stream from virtual device 24 sent to printer driver 44 and device 72 The structure for communicating option status and changes involves the TELNET commands WILL, WONT, DO, and DON'T. A TELNET command includes at least a two byte sequence: the Interpret As Command (IAC) escape character followed by the code for the command.

1. WILL->Indicates an intention to begin performing the option, or confirms that the option is now being performed.
2. WONT->Indicates a refusal to perform or to continue performing the option.
3. DO->Indicates a request that the other party perform the option, or confirms that the other party is expected to perform the option.
4. DON'T->Indicates a demand that the other party stop performing the option, or confirms that the other party is no longer expected to perform the option.

Figure 2:
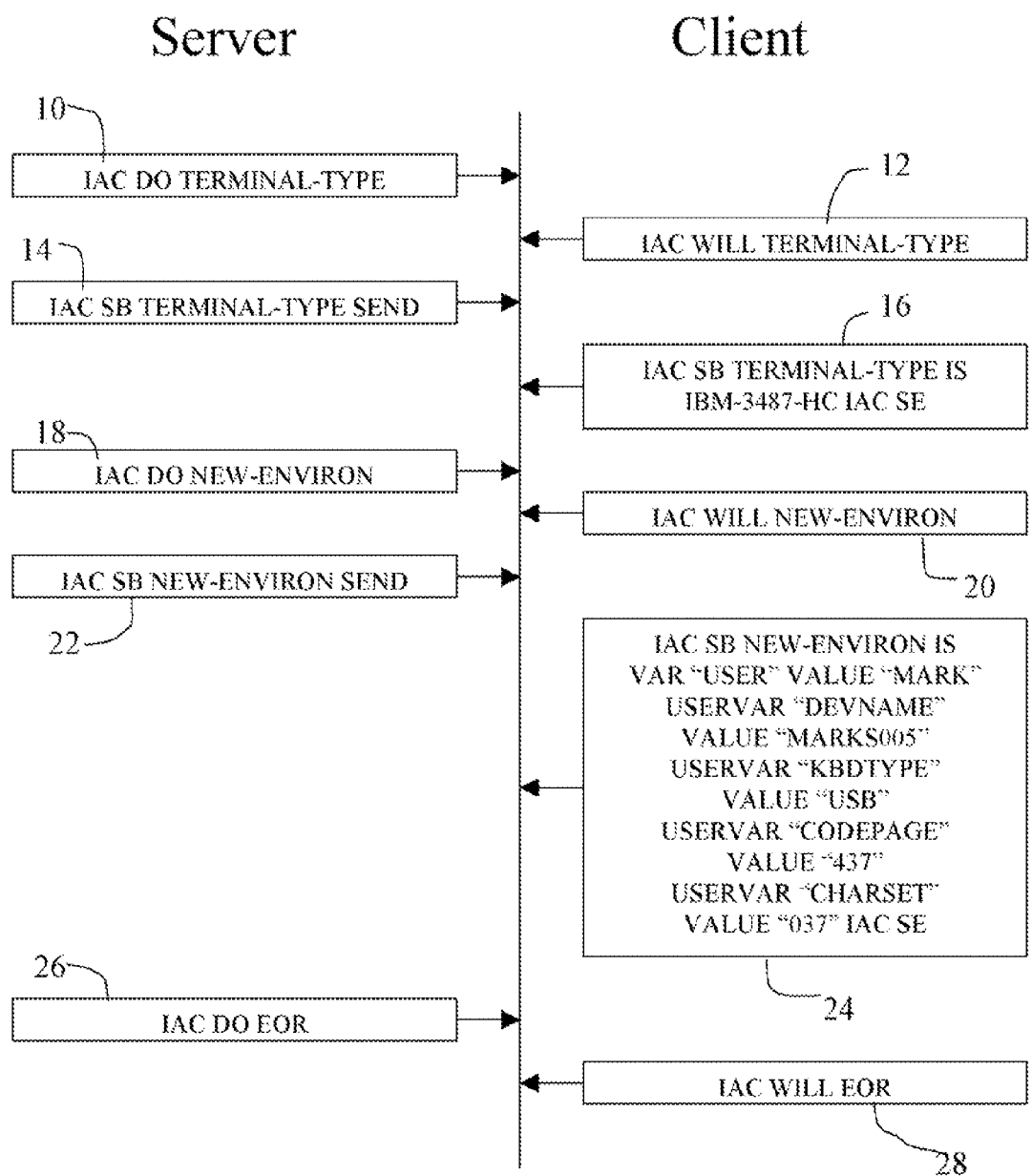
FIG. 2 illustrates a negotiation process for picking a device name.

FIG. 2 illustrates a negotiation process for picking a device name. Other than DO, DONT, WILL and WONT, there are few other communication options that allow both server and client to agree on a set of attributes. Character set, keyboard type, code page are few such communication options, FIG. 2 illustrates a negotiation process for picking a device name. Subnegotiation occurs in accordance with the following steps. First, the parties agree to discuss parameters in the normal manner: one party proposes the use of the option by sending a DO or WILL followed by the option code, and the other party accepts by returning a WILL or DO followed by the option code. Once both parties have agreed to use the option, subnegotiation takes place by using the command Subnegotiation Begin (SB), followed by the option code, followed by the parameter(s), followed by the command Subnegotiation End (SE). Each party is able to parse the parameter(s), since each has indicated by the initial exchange of WILL and DO that the option is supported.

FIG. 2 illustrates a negotiation process for picking a device name. Alternatively, the receiver may locate the end of a parameter string by searching for the SE command (that is, the string IAC SE), even if the receiver is unable to parse the parameters. Either party may refuse to pursue further Subnegotiation at any time by sending a WONT or DON'T to the other party. Thus, for option "ABC", which requires Subnegotiation to pass a parameter list, in addition to the option code, the following TELNET commands may be passed:

IAC WILL ABC
IAC DO ABC
IAC SB ABC IAC SE

FIG. 2 illustrates a negotiation process for picking a device name. In this sequence, an offer to use ABC is followed by a favorable acknowledgment of the offer, which is followed by one step of negotiation.

Alternatively, the sequence of commands may be:

IAC DO ABC
IAC WILL ABC
IAC SB ABC IAC SE

A request for the other party to use option ABC is followed by a favorable acknowledgment of the request, which is followed by one step of negotiation.

RFC 1205 describes the IBM 5250 TELNET interface. To enable 5250 mode, both the client and the server agree to at least support the Binary, End-of-Record (EOR), and Terminal-Type Telnet options set forth in RFCs 856, 885, and 884, respectively.

With the binary transmission option in effect, the receiver interprets characters received from the transmitter which are not preceded with IAC as 8 bit binary data, with the exception of IAC followed by IAC which stands for the 8 bit binary data with the decimal value 255. IAC followed by an effective TELNET command (plus any additional characters required to complete the command) is still the command even with the binary transmission option in effect. The meanings of WONT and DON'T are dependent upon whether the connection is presently being operated in binary mode or not. When connection is not presently operating in binary mode, the default interpretation of WONT and DON'T is to continue operating in the current mode, whether it is NVT ASCII, EBCDIC, or some other mode. Once a connection is operating in a binary mode as agreed to by both parties, a WONT or DON'T causes the encoding method to revert to NVT ASCII.

With the TELNET End-of-Record (EOR) option in effect on a connection between a sender of data and the receiver of the data, the sender transmits EORs. Otherwise, EORs are interpreted as null operations (NOPs.)

The TERMINAL-TYPE option allows a TELNET server to determine the type of terminal connected to a user TELNET terminal. The information obtained may be passed to a process, which may alter the data it sends to suit the particular characteristics of the terminal. By using the TERMINAL-TYPE and BINARY options, a TELNET server program may arrange to have terminals driven as if they were directly connected, including such special functions as cursor addressing, multiple colors, etc. not included in the Network Virtual Terminal (NVT) specification. WILL and DO are used to obtain and grant permission for future discussion, and the actual exchange of status information occurs within option subcommands (IAC SB TERMINAL-TYPE . . . ). A list of valid terminal types is found at the IANA website, at "http://www.iana.com."

An example of a typical negotiation process to establish 5250 mode of operation for a client having an IBM 5251-11 terminal is as follows. In this example, the server initiates the negotiation by sending the DO TERMINAL-TYPE request.

Server: IAC DO TERMINAL-TYPE
Client: IAC WILL TERMINAL-TYPE
Server: IAC SB TERMINAL-TYPE SEND IAC SE
Client: IAC SB TERMINAL-TYPE IS IBM-5251-11 IAC SE
Server: IAC DO END-OF-RECORD
Client: IAC WILL END-OF-RECORD
Server: IAC WILL END-OF-RECORD
Client: IAC DO END-OF-RECORD
Server: IAC DO TRANSMIT-BINARY
Client: IAC WILL TRANSMIT-BINARY
Server: IAC WILL TRANSMIT-BINARY
Client: IAC DO TRANSMIT-BINARY FIG. 2 illustrates a negotiation process for picking a device name. A user specifies a virtual device name of a Telnet session through an option negotiation handshaking sequence. The Telnet server informs the Telnet Client that a "NEW-ENVIRON" option can be negotiated. This option allows the Client application to negotiate with the Server to pick a device name that the Client wants. In step 10, the iSeries Telnet server sends the Telnet command "DO TERMINAL-TYPE" to Telnet client. In step 12, client responds with the Telnet command "WILL TERMINAL-TYPE". In step 14, the iSeries Telnet server sends the sub-negotiation command "SB TERMINAL-TYPE SEND" for the terminal-type option. In step 16, client responds to the sub-negotiation terminal type command in step 14 by sending any valid supported terminal type, for example "SB TERMINAL-TYPE IS IBM-3487-HC IAC SE" as shown in FIG. 2. In step 18, the iSeries Telnet server checks if client is capable of handling negotiations by sending the Telnet command "DO NEW-ENVIRON". In step 20, client responds to the "DO NEW-ENVIRON" command with either (1) "WILL NEW-ENVIRON", if it supports the method of the present disclosure, or (2) "WONT NEW-ENVIRON", if it does not. In step 22, the iSeries Telnet server sends the sub-negotiation command for the environment option "SB NEW-ENVIRON SEND". In step 24, client responds by passing up environment option information. The environment option information includes USER (User name), DEVNAME (device name). For display terminals along with USER, and DEVNAME, CODEPAGE, KBDTYPE, CHARSET information is also sent. For Print terminals, information such as PRINTERMODEL, PRINTER SOURCE, FONT, etc., are sent along with DEVNAME.

iSeries Telnet Server uses the environment option information received in step 24 from client to select or create a virtual device description. If device description already exists with the same information as received from client, the same device description is used, otherwise a new device description is created. Steps 26 and 28 indicate further negotiations. If the iSeries Telnet server successfully creates a virtual device for client, both server and client transmit EOR and BINARY options, which are then followed by initiation of a Telnet 5250 session.

Figure 3:
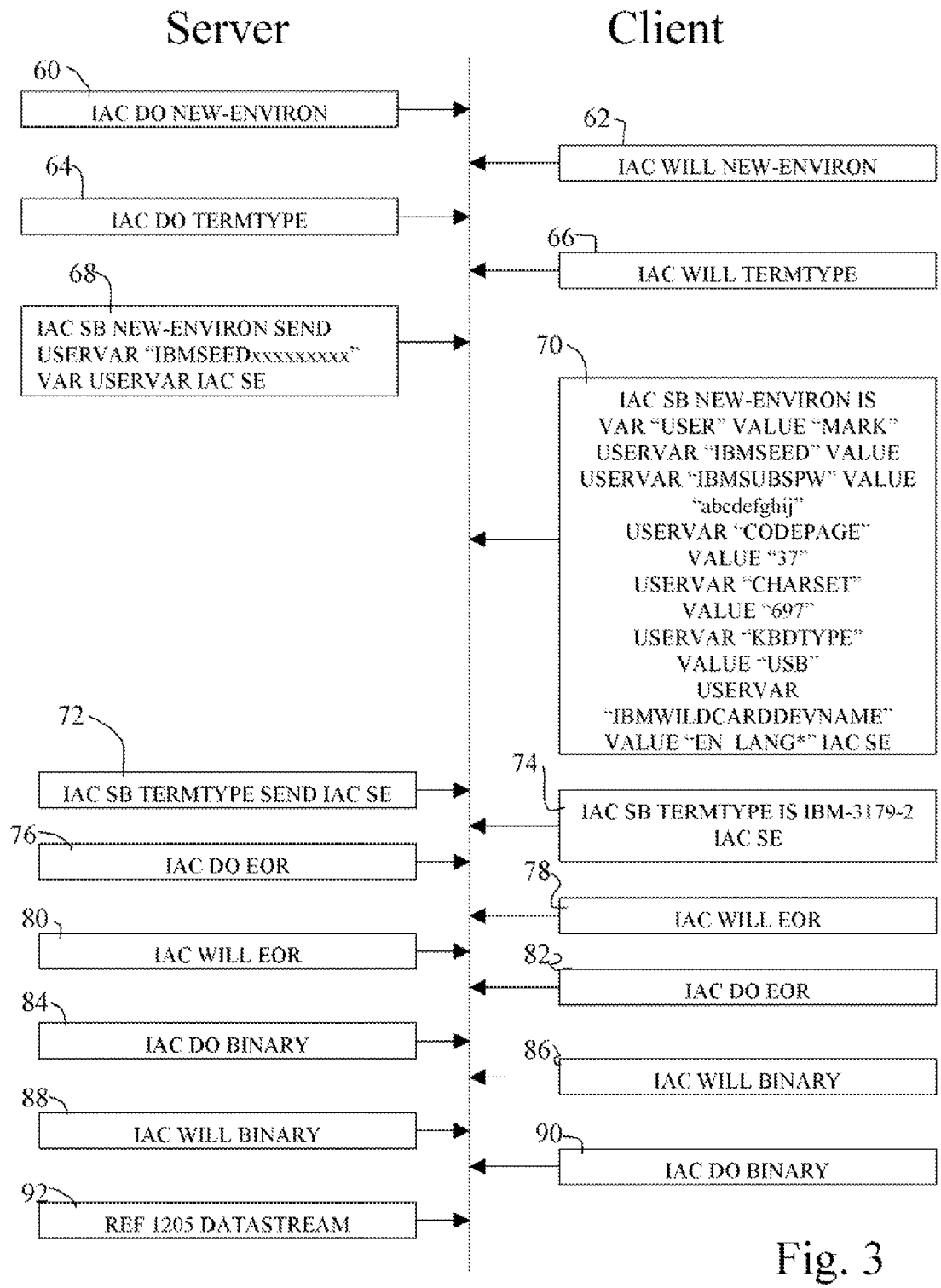
FIG. 3 illustrates negotiating a device name according to one embodiment of the present disclosure.

Referring to FIG. 3, in accordance with one preferred embodiment of the present invention, a system and method is provided for negotiating a virtual device name between a Telnet client and an iSeries Telnet server. Using the method of the present disclosure, a Telnet client sends the iSeries Telnet server a string containing wildcard characters. An iSeries Telnet server can define a wildcard character. For example, a pre-defined set or list of wildcard characters may be documented in the RFC. A '*' character may be part of the list. Typically '*' can be used as a wildcard character, but any other character can be designated as such. As an example, a Telnet Client can send "EN_LANG*" as part of device name. An iSeries Telnet server on receiving '*' as part of device name understands that the client is requesting a new device name to be generated. For instance, the presence of a wildcard character (for example, '*') in the DEVNAME field indicates to the Telnet server to generate a new device name, for instance, because '*' is a documented pre-defined wildcard character. It then takes the characters other than the wildcard characters) in the device name, in the above example, those preceding the '*' in the device name field, and generates a unique name which is not currently used. The logic for generating a new device name can be simple such as concatenating as suffix a number to the characters preceding '*' in the device name field sent by the client: for example, EN_LANG0001, EN_LANG0002, etc, Since wildcard characters are being sent as part of the device name, it is almost certain that the Telnet server will generate a unique device name based on the non-wildcard characters in the device name specified by the client. The Telnet server need not have to keep asking for a renegotiation of the virtual device name for every device that is not available. Instead, the server generates a unique name and verifies that the new name is not being used already. In case the server falls to generate a unique device name, for instance, because it exhausted all the name combinations that it could generate based on the base name (i.e., non-wildcard characters in the device name) specified by the Client, the Server may generate an alternative name and assign it to a virtual device, or reject the client supplied device name upon which the client can re-negotiate.

The method and system of the present disclosure may easily adapt to various rules or protocols that may be imposed on the naming conventions. For instance, in the current, implementation of iSeries, the maximum length of the device name is 10 characters. If the Client specified "EN_LANGUS*" in the device name field and requested the Telnet server to generate a device name, there is only one character position available in generating a unique name. That is, the string specified in the device name field already has nine valid characters for the device name; only one is left for the Telnet server to fill. In this case, the Telnet server can choose to replace '*' with numbers 0 through 9 or alphabets A through Z, allowing Telnet server to generate 36 different device names. If there are already devices active on the Telnet server with all the 36 name combinations, Telnet server will not be able to generate any more unique names. In such cases, the Telnet server or like can generate any other unique name. For instance, in the case of the Telnet server, the Telnet server may follow the OS/400 standard naming convention such as QPADEV0001 and create a device with that name that is unique by varying the modifiable characters (e.g., suffix "0001" of QPADEV0001). The variable portion to generate a unique device name need not be only the suffix portion, but can be prefixed or embedded. In another embodiment, the host such as the iSeries server may ask the client to renegotiate with different prefix (suffix or basename) in the device name field.

Table 1 illustrates device name negotiation in TN5250E environment.

TABLE 1

| iSeries Telnet Server | Telnet 5250 Client |
|---|---|
| IAC DO NEW-ENVIRON | -> |
|  | <- IAC WILL NEW-ENVIRON |
| IAC DO TERMTYPE | -> |
|  | <- IAC WILL TERMTYPE |
| IAC SB NEW-ENVIRON SEND USERVAR "IBMRSEEDxxxxxxxx" VAR USERVAR IAC SE | -> |
|  | <- IAC SB NEW-ENVIRON IS VAR "USER" VALUE "MARKOSIA" USERVAR "IBMRSEED" VALUE USERVAR "IBMSUBSPW" VALUE "abcdefghi" USERVAR "DEVNAME" VALUE "MARKSDEVAA" USERVAR "CODEPAGE" VALUE "37" USERVAR "CHARSET" VALUE "697" USERVAR "KBDTYPE" VALUE "USB" IAC SE |
| IAC SB NEW-ENVIRON SEND | -> |
|  | <- IAC SB NEW-ENVIRON IS USERVAR "DEVNAME" VALUE "MARKSDEVAB" |
| IAC SB NEW-ENVIRON SEND | -> |
|  | IAC SB NEW-ENVIRON IS USERVAR "DEVNAME" VALUE "MARKSDEVAC" |

TABLE 1-continued

| iSeries Telnet Server | Telnet 5250 Client |
|---|---|
| IAC SB NEW-ENVIRON SEND |  |
|  | <- IAC SB NEW-ENVIRON IS USERVAR "DEVNAME" VALUE "MARKSDEVAD" |
| IAC SB TERMTYPE SEND IAC SE | -> |
|  | <- IAC SB TERMTYPE IS IBM-3179-2 IAC SE |
| IAC DO EOR | -> |
|  | <- IAC WILL EOR |
|  | <- IAC WILL EOR |
| IAC WILL EOR | -> |
|  | <- IAC DO EOR |
| IAC DO BINARY | -> |
|  | <- IAC WILL BINARY |
| IAC WILL BINARY | -> |
|  | <- IAC DO BINARY |

In one embodiment, the device name containing the wildcard character is sent from the client to the server as an environment variable and value pair during Sub-negotiation of the connection between the client and the server. Table 2 describes an example of the Telnet connection negotiation between a client and server using the new environment variable.

A new environment variable, IBMWILDCARDDEVNAME, is defined for sending the device name with wildcard characters. As an example, the value for the variable can be any text followed by a predefined wildcard character. It should be noted, however, that the wildcard character need not only be a character following the device name text, but may precede or be embedded in the name. The iSeries Telnet server can define what the wildcard character is. If the iSeries Telnet server is unable to generate a unique device name based on the prefix characters sent by the client, server can ask for renegotiation or disconnect.

In Tables 1 and 2, the Telnet commands WILL, WONT, DO, and DON'T comprise at least a two byte sequence: the Interpret As Command (IAC) escape character followed by the code for the command. SB signifies "Subnegotiation begin", and SE "Subnegotiation end". Each statement set is followed by the corresponding hexadecimal representation. WILL (option code) indicates a desire to begin performing the option, or confirms that the option is now being performed. WONT (option code) indicates a refusal to perform or to continue performing the option. DO (option code) indicates a request that the other party perform the option, or confirms that the other party is expected to perform the option. DON'T(option code) indicates a demand that the other party stop performing the option, or confirms that the other party is no longer expected to perform the option.

Referring to FIG. 3, the procedure of Table 2 is set forth. In step 60, the Telnet server tests if client is capable of handling negotiations. In step 62, client responds that it supports negotiations. In steps 64 and 66 the server and client exchange DO TERMTYPE and WILL TERMTYPE Telnet commands. In step 68, the Telnet server sends the Subnegotiation Telnet command set IAC SB NEW-ENVIRON SEND USERVAR "IBMSEEDxxxxxxxx" VAR USERVAR IAC SE to client. In step 70, the response from client includes USERVAR "IBMWILDCARDDEVNAME" VALUE followed by a device name that contains predefined wildcard characters. Based on this wildcard in the device name the Telnet server generates a unique device name for this connection. In steps 72, 74, 76, 78, 80, 82, 84, 86, 88, 90, 92, negotiations continue to normal completion. If the server is unable to generate a device name based on the wildcard device name specified by the client, the server can ask for renegotiation.

RFC 2877 also provides a "Display Confirmation Record" (IBMSENDCONFREC) environment variable through which a client can learn about what device name has been assigned to client by the iSeries Telnet server. When IBMSENDCONFREC environment variable is negotiated, the iSeries Telnet, server sends additional information as to whether the device was successfully created or not. If the device is successfully created, the information will contain the code and the device name. For example, "1902RCHASSQ1EN_LANG001" where 1902 is the code, "RCHASSQ1" is the iSeries name and "EN_LANG001" is the device name. In case of failure an error code will be sent down by the iSeries Telnet Server. In one embodiment, the client may also include the IBMSENDCONFREC environment variable in its negotiations since the client will be sending wildcard character as part of the device name. This way, the client will learn what name the server created without using additional data flow between the client, and the server. In one embodiment, IBMSENDCONFREC environment is used for letting the server know that the client wants to know the outcome of negotiations. In response to IBMSENDCONFREC the server sends to the client (1) Reason code (2) Description of the reason code (3) Server Name and (4) Device Name. An example is "1902-Session successfully started".

Table 2 illustrates negotiating device name using wildcard characters.

TABLE 2

| iSeries Telnet Server | | Telnet 5250 Client |
|---|---|---|
| IAC DO NEW-ENVIRON | -> | |
| | <- | IAC WILL NEW-ENVIRON |
| IAC DO TERMTYPE | -> | |
| | | IAC WILL TERMTYPE |
| IAC SB NEW-ENVIRON SEND USERVAR "IBMRSEEDxxxxxxxx" VAR USERVAR IAC SE | -> | |
| | <- | IAC SB NEW-ENVIRON IS VAR "USER" VALUE "MARKOSIA" USERVAR "IBMRSEED" VALUE USERVAR "IBMSUBSPW" VALUE "abcdefghi" USERVAR "CODEPAGE" VALUE "37" USERVAR "CHARSET" VALUE "697" USERVAR "KBDTYPE" VALUE "USB" USERVAR "IBMWILDCARDDEVNAME" VALUE "EN_LANG*" USERVAR "IBMSENDCONFREC" VALUE "YES" IAC SE |
| IAC SB TERMTYPE SEND IAC SE | -> | |
| | <- | IAC SB TERMTYPE IS IBM-3179-2 IAC SE |
| IAC DO EOR | -> | |
| | <- | IAC WILL EOR |
| IAC WILL EOR | -> | |
| | <- | IAC DO EOR |

TABLE 2-continued

| iSeries Telnet Server | | Telnet 5250 Client |
|---|---|---|
| IAC DO BINARY | -> | |
| | <- | IAC WILL BINARY |
| IAC WILL BINARY | -> | |
| | <- | IAC DO BINARY |

The system and method of the present disclosure may be implemented and am on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of dynamically negotiating a device name for establishing a communications session between a host computer and a client computer, comprising:
    receiving one device name from a client computer, said device name comprising a string including one or more fixed characters and at least a wildcard character;
    replacing, by a host computer, said wildcard character in the device name with one or more second characters to generate a unique device name that is not already being used in the host computer; and
    notifying the client computer of the unique device name for use.

2. The method of claim 1, wherein said one or more second characters include alphanumeric characters.

3. The method of claim 1, wherein said device name is received from the client as an environment variable.

4. The method of claim 1, wherein said unique device name is sent to the client computer as an environment variable.

5. The method of claim 1, further including:
    replacing said one or more fixed characters in the received device name to generate a unique device name that is not being used in the host computer, if all device names generated by replacing said wildcard character are being used in the host computer.

6. The method of claim 1, further including:
    asking the client computer to send a different device name, if all device names generated by replacing said wildcard character are being used in the host computer.

7. The method of claim 1, wherein said method is performed to establish a Telnet session.

8. The method of claim 1, wherein said method is performed to establish a session between a host computer and a remote client computer, for allowing the remote client computer to log into the host computer.

9. The method of claim 1, wherein said device name is a virtual device name.

10. The method of claim 1, wherein said wildcard character is suffixed to said one or more fixed characters.

11. The method of claim 1, wherein said wildcard character is prefixed to said one or more fixed characters.

12. The method of claim 1, wherein said wildcard character is embedded in said one or more fixed characters.

13. A system for dynamically negotiating a device name for establishing a communications session between a host computer and a client computer, comprising:

a host computer receiving one device name from a client computer, said device name comprising a string including one or more fixed characters and at least a wildcard character, said host computer further replacing said wildcard character in the device name with one or more second characters to generate a unique device name that is not already being used in the host computer, and notify the client computer of the unique device name for use.

14. The system of claim 13, further including:

the client computer including a physical device which maps to said device name, said client computer sends said device name to said host computer.

15. The system of claim 13, wherein if there are no more unique names that can be generated based on the device name received from the client, the host computer generates a second unique device name based on a criteria associated with the host computer.

16. The system of claim 13, wherein if there are no more unique names that can be generated based on the device name received from the client, requesting the client to send a second device name.

17. A program storage device readable by a machine, tangibly embodying a program of instructions executable by the machine to perform a method of dynamically negotiating a device name for establishing a communications session between a host computer and a client computer, comprising:

receiving one device name from a client computer, said device name comprising a string including one or more fixed characters and at least a wildcard character;

replacing said wildcard character in the device name with one or more second characters to generate a unique device name that is not already being used in a host computer; and notifying the client computer of the unique device name for use.

18. The program storage device of claim 17, wherein said one or more second characters include alphanumeric characters.

19. The program storage device of claim 17, wherein said device name is received from the client as an environment variable.

20. The program storage device of claim 17, wherein said unique device name is sent to the client computer as an environment variable.

* * * * *